United States Patent [19]

McCallum et al.

[11] Patent Number: 4,958,172

[45] Date of Patent: Sep. 18, 1990

[54] CHARGE TRANSFER IMAGING CARTRIDGE

[75] Inventors: Robert S. McCallum, Terra Cotta; Brian McIntosh, Toronto; Hemant Gandhi, Mississauga, all of Canada

[73] Assignee: Delphax Systems, Mississauga, Canada

[21] Appl. No.: 336,167

[22] Filed: Aug. 22, 1989

[30] Foreign Application Priority Data

Apr. 11, 1988 [CA] Canada .................................. 563828

[51] Int. Cl.$^5$ .............................................. G01D 15/00

[52] U.S. Cl. ...................................... 346/159; 346/155

[58] Field of Search ............ 346/150, 155, 159, 153.1, 346/139 L

[56] References Cited

U.S. PATENT DOCUMENTS 4,467,333 8/1984 Seimiya et al. ..................... 346/159

*Primary Examiner*—Arthur G. Evans

*Attorney, Agent, or Firm*—Rogers & Scott

[57] ABSTRACT

A charge transfer imaging cartridge features driver electrodes extending in a first direction and finger electrodes extending in a second direction and defining edge structure straddling the driver electrodes. The driver and finger electrodes are separated by a flexible dielectric layer, preferably a silicone modified polymer.

6 Claims, 5 Drawing Sheets

GRAPH OF WEIGHT LOSS VS TIME

| ESL-241 | A | | | B | | | C | | |
|---|---|---|---|---|---|---|---|---|---|
| % ORGANIC BINDER (POLYMER) | 62% | | | 37% | | | 27% | | |
| INORGANIC FILLER (IGNORING SOLVENT, WETTING AGENTS, ETC.) | 38% | | | 63% | | | 73% | | |
| $d_1$ $d_2$ $d_3$/um | 20 | 27 | 35 | 20 | 27 | 35 | 20 | 27 | 35 |
| RESISTANCE TO SHORT TIME ELECTRICAL STRESS @ $1400v_{rms}$, 60 Hz | 100% FAIL | 50% PASS | 100% PASS | 100% FAIL | 50% PASS | 100% PASS | 100% FAIL | 50% PASS | 100% PASS |
| THRESHOLD VOLTAGE | — | 1400 | 1600 | — | 1200 | 1400 | — | 1100 | 1300 |
| LIFE / HRS | — | 5-25 | 30-60+ | — | 5-20 | 25-60+ | — | 5-20 | 25-100+ |

FIG. 8

CHARGE TRANSFER IMAGING CARTRIDGE

BACKGROUND OF THE INVENTION

This invention relates to charge transfer imaging cartridges for creating latent images on a dielectric for subsequent toning and transfer to a carrier. More particularly, the invention includes cartridges for creating the images and a method of making the cartridges.

The present invention is described herein with reference to an exemplary printer which utilizes a dielectric coated print drum. However, it will be clear to those skilled in the art that the present invention may also be used in combination with printers utilizing different configurations of image receiving surfaces, and indeed may be useful in machines other than printers.

There is an increasing need for peripherals which can accept a computer or word processor output and convert the output to an image on paper, commonly called a "hard copy". Typically such a peripheral is a printer which uses a charge transfer process similar to that described in U.S. Pat. No. 4,267,556 to Fotland and Carrish. This printer utilizes a combination of electrodes about a dielectric which can be controlled to place a charge on a drum coated for instance with aluminum oxide impregnated with a wax. In this way a latent image is built up corresponding to the image to be produced on the paper, and the latent image is then toned and transferred to the paper and fused. Should it be necessary to produce a second copy, the procedure is repeated to give as many copies as necessary. Further, it is possible to vary the image by electronic control so that parts of the image can be printed, or the complete image can be turned through 90 degrees with respect to the paper. These possible variations make such printers desirable equipment wherever hard copies of electronically generated information are required.

An example of cartridge construction is described in applicant's U.S. Pat. Nos. 4,679,060 and 4,745,421 both to McCallum et al. This cartridge includes a number of relatively thin planar structural layers and produces a charge transfer image by means of a charge generator in the form of a matrix of electrodes located on an inner surface of the cartridge. The charges generated by the cartridge are formed through the application of a high voltage alternating potential between two conductors, commonly referred to as driver electrodes and finger electrodes, separated by a solid dielectric. The finger electrodes are provided with a multiplicity of holes around the edge of which the charges are formed, and an extraction voltage pulse is supplied between the finger electrodes and the print drum to attract the charges to the dielectric surface of the drum. In order to create a dot image on the drum from any one hole, two potentials must be present simultaneously, that is, the discharge potential and the extraction potential. This permits dot matrix multiplexing with a minimum number of interconnections and pulse drive sources.

The cartridge described in this patent also describes a further screen electrode between the finger electrode and the drum which acts to provide better definition of the dot images.

In use, it has been found that the preferred material for the dielectric between the driver and finger electrodes is mica, especially Muscovite mica, $H_2KAl_3(SiO_4)_3$, as it possesses the desirable qualities for a dielectric in such circumstances, namely: high dielectric strength, low dissipation factor, high dielectric constant, high corona resistance, and is translucent which facilitates the positioning of the various electrodes during manufacture of the cartridge.

Dielectric strength is simply the minimum voltage required to cause physical breakdown, for example, puncturing, of a insulating film of a given thickness. This is important in cartridges as the dielectric will have to withstand 2000 to 3000 Volts peak-to-peak at radio frequency, and the dielectric layer must be kept relatively thin for the formation of charge to occur. The dielectric strength of mica is in the range of 3000 to 6000 Volts/Mil.

The dissipation factor of a material can be stated in terms of the difference between the amount of energy required to charge a capacitor with the material between the plates and the amount of energy received in return when the capacitor is fully discharged. The difference, or energy losses, arise from both the inherent electrical resistance of the dielectric and from hysteresis effects, and result in heating of the dielectric. The dissipation factor of mica is normally 0.01 to 0.04.

For an insulating material, the dielectric constant (k) is defined as the ratio of the electrical capacity of a capacitor with that material between the plates to the electrical capacity of a similar unit with air between the plates. For all practical purposes, the dielectric constant of the dry air is taken as unity, and the dielectric constant of mica is in the region of 6.5 to 8.

The creation of charges at the finger electrodes takes the form of a corona discharge, which process includes the creation of substances which tend to degrade dielectric materials in addition to the degradation effects of the dielectric stress on the material. The corona resistance of a material is simply a measure of its ability to withstand this degradation.

While mica meets the desirable specifications, it suffers from a number of disadvantages. At present, mica is only available from a single source and continued reliable supply cannot be assured. Also, as mica is a naturally occurring material, there is only a finite reservoir available, and as the demand for such cartridges increases, this reservoir will become depleted. However, the main reasons for seeking an alternative to mica are its physical limitations. Mica is fragile and liable to cracking and must therefore be handled very carefully during shipping and at all stages of manufacture of the cartridges. Also, mica is only available in a limited range of sizes and this limits the possible physical dimensions and configurations of cartridges. This is a handicap now that there is a demand for longer cartridges to create wider images, and in an attempt to overcome this limitation some work has been done to develop modular cartridges made up of two or more shorter cartridges to be used in place of a single longer cartridge. In the event it has proven difficult to match the images created by adjacent cartridges evenly and it is of course more expensive to produce two or more shorter cartridges in place of one longer cartridge. Also, a demand has arisen for narrower cartridges. Previously, this has been impractical because mica is always sized to leave a width of mica between the edge of the mica sheet and the area in which uniform properties are required, because the breaking of the mica at the edges causes unpredictable discontinuities and cracking.

Initial investigations to locate an alternative dielectric were directed to glasses and glass ceramic dielectrics, which, while possessing many of the necessary properties outlined above, created other difficulties. High temperature dielectrics, requiring firing above 850°C., required the provision of a ceramic substrate for the cartridge in place of the traditional epoxy substrate. The provision of the ceramic substrate made the cartridges prohibitively expensive. Lower temperature dielectrics, having firing temperatures around 600°C., required the use of either a glass substrate, which was found to be fragile and to provide poor heat sink, or a porcelaine coated steel substrate, which while being inexpensive and easily formed has an uneven surface unsuited for use in a cartridge.

Other problems were encountered in placing the dielectric on the substrate using the preferred method of application, that is, screen printing, which resulted in large area defects. Also, plating the driver electrodes on porcelain was found to be difficult, and the plated driver electrodes also tended to react with the glass dielectrics.

Low temperature dielectrics were a generally more attractive alternative in view of the less arduous curing techniques required, which would permit continued use of the current manufacturing process, though initial tests with such commonly available low temperature dielectrics such as epoxies, phenolics and acrylics confirmed the commonly held view that low temperature dielectrics had poor corona resistance and would have a very short life span in a cartridge.

During testing of the various dielectrics it was discovered that corona resistance was significantly improved when partially assembled cartridges were tested. This was found to be the result of the presence of a silicone based adhesive on the surface of the dielectric which was subsequently removed during the further manufacturing process. This led to an investigation of silicones generally and further testing revealed that silicones, or polymeric organic siloxanes, exhibited high corona resistance.

A subsequent search located a number commercially available silicone modified polymers intended for other uses. Initial tests showed the materials to have the necessary corona resistance and the potential for use in place of mica.

SUMMARY OF THE INVENTION

Accordingly, it is an object of the present invention to provide a cartridge for use in charge transfer imaging using a suitable low temperature dielectric. It is a further object of the invention to provide a method of manufacturing such a cartridge.

In one aspect of the present invention there is provided a charge transfer imaging cartridge comprising a dielectric substrate, first electrodes extending along one side of the substrate, second electrodes extending in a second direction, and a silicone modified polymer dielectric layer separating the first and second electrodes.

BRIEF DESCRIPTION OF THE DRAWINGS

This and other aspects of the invention will now be described, by way of example, with reference to the accompanying drawings, in which:

FIG. 8 is a table illustrating various effects of varying dielectric thickness and composition in a cartridge.

DESCRIPTION OF THE PREFERRED EMBODIMENTS

Figure 1:
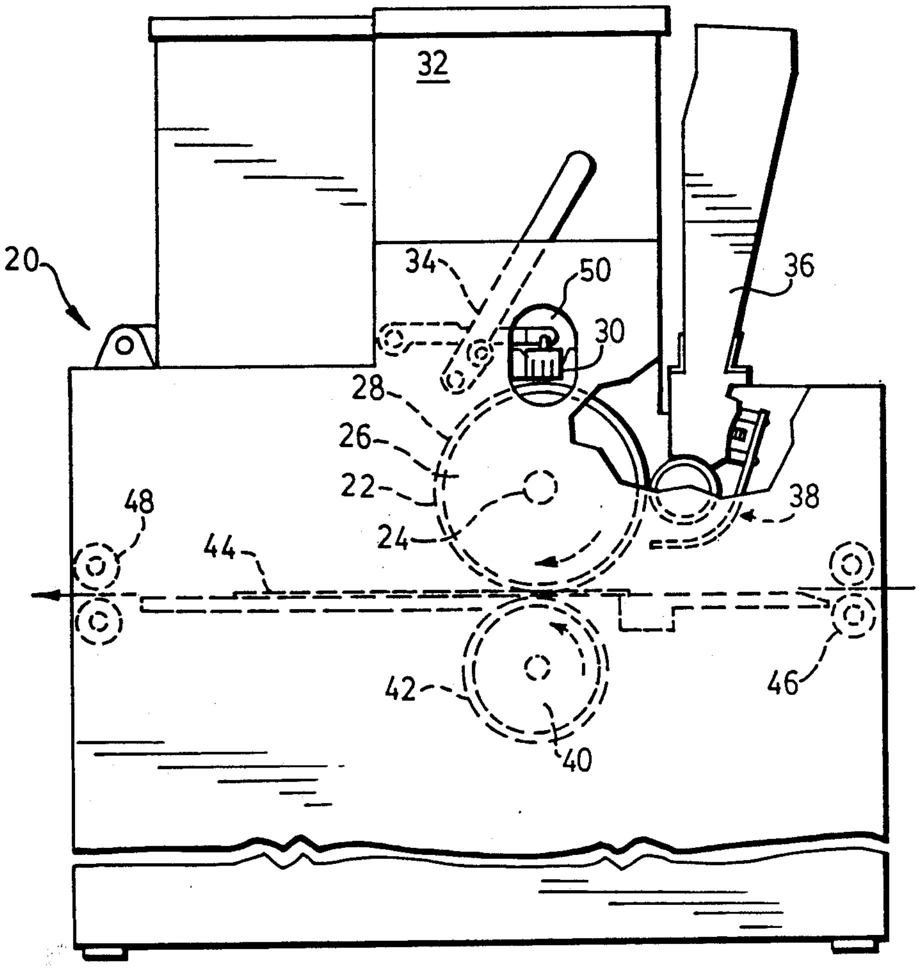
FIG. 1 is a side view of an exemplary charge transfer printer containing a cartridge according to a preferred embodiment of the present invention, the cartridge being seen in end view.

Reference is made first to FIG. 1, which is a somewhat schematic side view of an exemplary printer incorporating charge transfer imaging and including a preferred embodiment of cartridge according to the present invention. The invention is particularly useful with this type of printer but could be used with printers of different configurations and other equipment in which charge transfer imaging is used.

A print drum 22 is mounted for rotation about an axis 24 and has an electrically conductive core 26 with a dielectric surface 28 capable of receiving an image from a charge transfer print cartridge 30 in accordance with a preferred embodiment of the present invention. The cartridge 30 is driven by an electrical control system 32 and is held in place by a cartridge mounting 34. As the drum 22 rotates in the direction shown, a latent image is created by the cartridge 30 on the outer surface of the dielectric surface 28. This image then comes into contact with toner supplied from a hopper 36 by a feeder mechanism 38. The resulting toner image is carried by the drum 22 towards a nip formed with a pressure roller 40 having a compliant outer layer 42 positioned in the path of a receptor such as a paper sheet 44 which enters the printer between a pair of feed rollers 46. The pressure in the nip is sufficient to cause the toner to transfer onto the paper sheet and, because of the pressure applied aided by the fact that the axes of the drum 22 and roller 40 lie at an angle of about 45 minutes to one another, the toner will be fused to the paper as it is transferred from the drum to the paper. The paper leaves the printer between a pair of output rollers 48.

It is desirable that all operator functions and maintenance may be carried out from one side of the printer, and for this purpose an access opening 50 is provided in the side of the printer to permit access to the cartridge 30 after releasing the cartridge 30 by activating the mounting 34.

Figure 4:
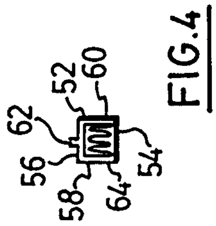
FIG. 4 is an end view of the cartridge of FIG. 2.
Figure 2:
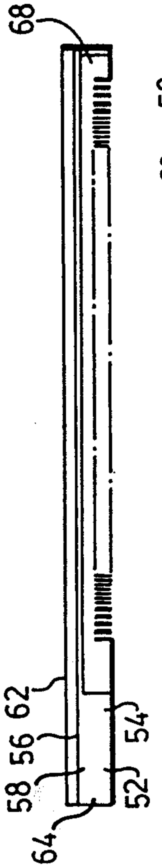
FIG. 2 is a side view of the cartridge of FIG. 1.
Figure 3:
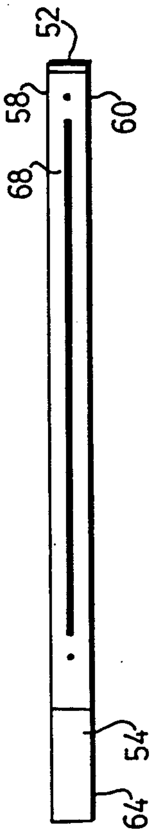
FIG. 3 is a view of the cartridge of FIG. 2 from below.

Reference will now be made to FIGS. 2 to 4 which show various views of the cartridge 30 itself. The main structural member of the cartridge 30 is a hollow and generally rectangular elongate aluminum spine 52, having respective inner, outer and side walls 54, 56, 58, 60. The outer wall 56 is provided with a longitudinally extending locating rib 62 for engagement with the cartridge mounting 34 (FIG. 1) and one end of the spine forms a handle 64 by which the spine may be gripped to be withdrawn from the mounting 34. The interior of the spine 52 features a number of fins, one of which is designated 66, which extend outwards from the inner wall 54 parallel to the side walls 58, 60. In cartridges for use in high speed printers the fins dissipate heat from the inner wall to cooling air which is passed through the spine 52. In cartridges used in low speed printers the fins may facilitate heating of the inner wall from heating air passed through the spine or alternatively, the fins may be dispensed with and a heating element (not shown) located in the spine.

A flexible substrate 68 is affixed to the inner and side walls 54, 58, 60 of the spine 52. The substrate serves as a mounting for the various components of the cartridge 30 which will be described with reference to FIG. 5.

Figure 5:
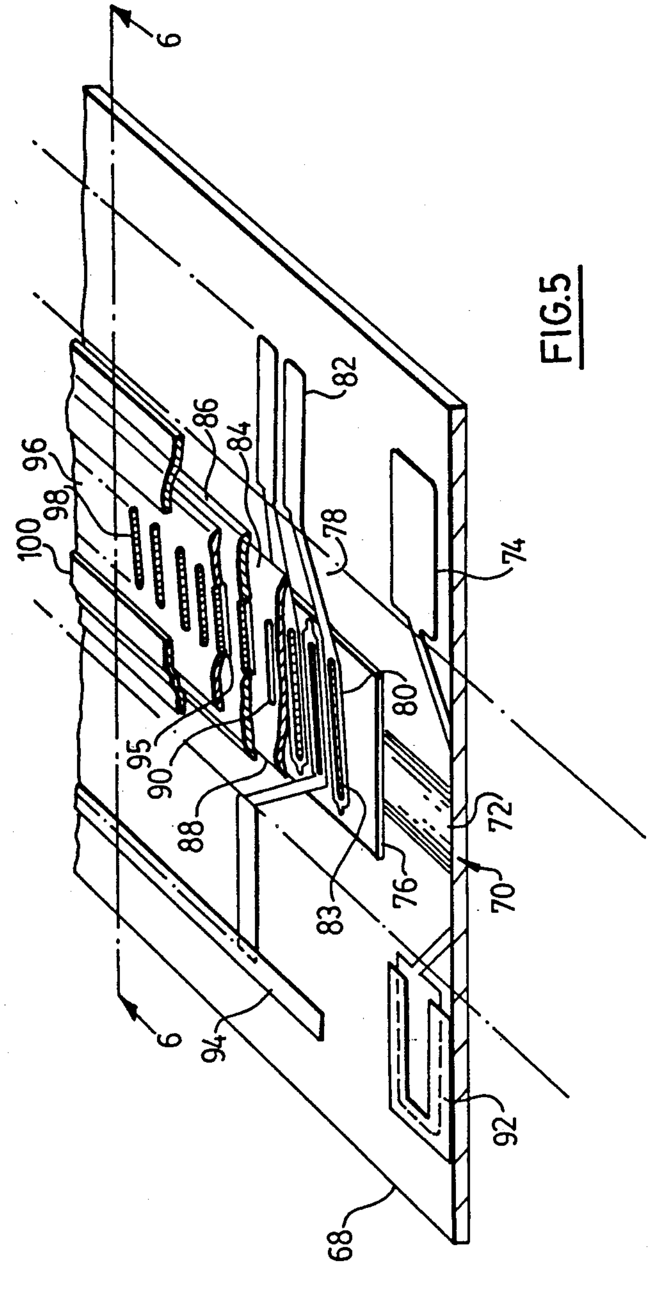
FIG. 5 is a perspective view with layers broken away of the cartridge of FIG. 2 during manufacturing.
Figure 7A:
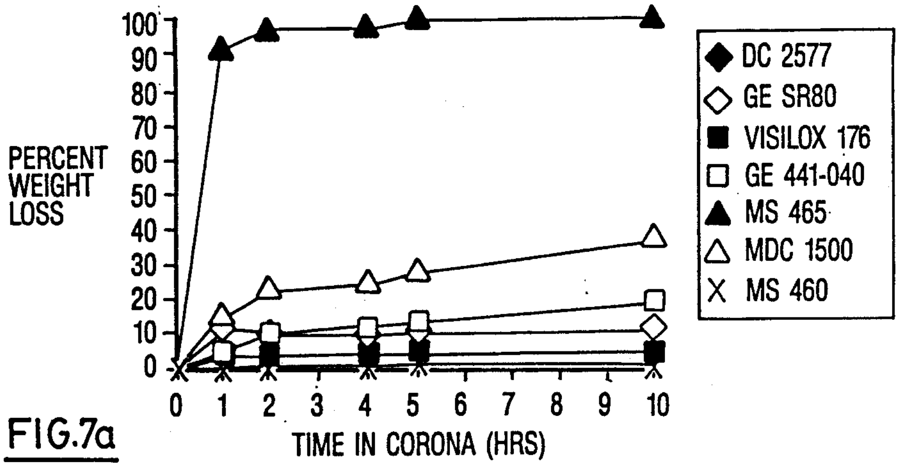
FIGS. 7*a* and 7*b* are graphs illustrating weight loss of various dielectric materials subject to corona, with respect to time.
Figure 7B:
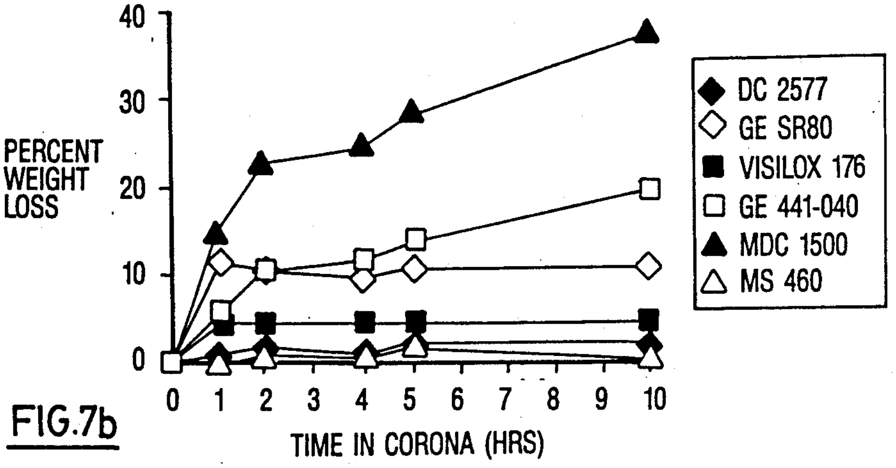

FIG. 5 shows a cartridge during manufacture, where all of the components are mounted on the substrate 68, but before the substrate is formed on to the spine 52. The innermost components carried by the flexible substrate 68, which in this example is a flexible dielectric material such as glass fibre reinforced epoxy, are the first or driver electrodes 70. These electrodes 70 are formed by etching the copper coated substrate 68 and comprise a plurality of parallel conductors 72 which extend generally longitudinally along the substrate 68, and individual contacts 74 extend generally transversely from one end of each of the parallel conductors 72.

A dielectric layer 76, the subject of the present invention, is located over the parallel conductors 72 and will be described in greater detail following the description of the cartridge.

Second or finger electrodes 78 are formed by etching a stainless steel sheet and are subsequently affixed over the dielectric layer 76 to form the next layer as shown in FIG. 5. The electrodes 78 comprise first portions 80 for location over the dielectric layer 76, and individual contacts 82 arranged at alternate ends of the first portions 80 to the sides of the dielectric layer 76. It should be noted that in other cartridge designs the contacts may all extend to one side of the dielectric layer 76. The first portions 80 include holes 83 which provide edge structures 85 (FIG. 6) to act as corona or charge generation sites.

A spacer layer 83 is created by applications of two thinner layers 84 and 86 located over the finger electrodes 78. The layers 84 and 86 are formed by separately laminating the substrate with a dry film solder mask such as that sold under the trade mark VACREL by DuPont, which is subsequently etched. Two layers are used simply to get the required thickness and they include central portions 88 to cover the first portions of the finger electrodes 78 and a plurality of parallel slots 90 are provided in locations corresponding to the apertures formed in the first portions 80 of the finger electrodes. End portions 92 of the layer 84 occupy the spaces between the contacts 74 of the driver electrodes, and side portions 94 secure the ends of the first electrode contacts 82 to the substrate 68. The second spacer layer 86 is applied over the central portion 88 of the first spacer layer.

A screen electrode 96 is supported by the second or outermost spacer layer 86. The screen electrode 96 and associated spacer layers 84, 86 are optional because the driver and finger electrodes 70, 78 provide the necessary charge imaging matrix. However, print quality is considerably enhanced by use of the screen electrode 96 which is therefore used in the preferred embodiment. The electrode 96 is formed with a plurality of apertures 98 arranged in parallel lines corresponding to the respective apertures and slots of the finger electrodes and spacer layers. A solder mask overcoat layer 100 is the final component to be applied to the substrate and serves to seal the screen 96 to the substrate 68.

The substrate assembly is applied to the spine 52 (FIG. 4) and is held in place by a layer of double sided adhesive tape. The portion of the substrate carrying the parallel conductors 72 and the first portions 80 of the finger electrodes is affixed to the inner wall of the spine and the portions of the substrate carrying the electrode contacts are secured to the side walls of the spine.

Figure 6:
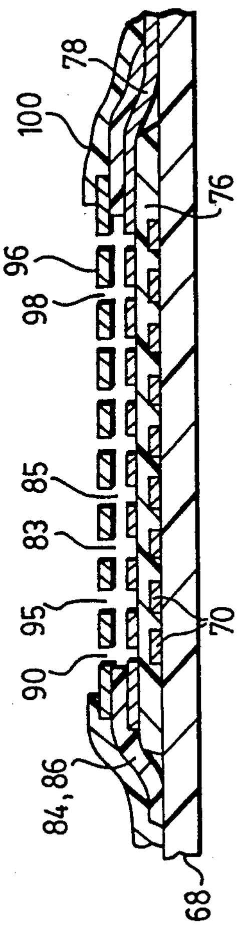
FIG. 6 (drawn adjacent FIGS. 3 and 4) is a diagrammatic sectional view on line 6—6 of FIG. 5.

FIG. 6 is a schematic sectional view of the cartridge of FIG. 5, and it should be noted that some thicknesses have been exaggerated to better illustrate the construction of the cartridge. Also, the two spacer layers 84, 86 are shown as a single layer.

By application of an alternating voltage between selected driver and finger electrodes 70, 78, a corona discharge is created by breakdown of air at the edges 85 of the apertures in the finger electrodes. A futher extraction voltage pulse is applied to the finger electrode to propel the charges to the drum. As was mentioned above, a further potential is applied to the screen electrode to focus the charges as they travel through the various apertures and slots of the cartridge towards the drum.

Degradation of the dielectric layer 96 can occur, for example, at the exposed portions in the apertures 83 of the finger electrodes, and the cartridge may fail due to dielectric being lost to an extent which allows dielectric breakdown between the electrodes 70, 78. There may be other causes of failure related to the dielectric including contamination, leeching of a chemical component of the dielectric or moisture absorption.

FIGS. *7a* and *7b* illustrate the results of a test carried out to determine the corona resistance of various materials. Samples of low temperature dielectrics were applied as pastes to glass slides and cured before being subjected to corona in a plasma etcher. The uppermost line of FIG. *7a* illustrates the behaviour of an acrylic resin, which would result in failure of the cartridge within minutes. The other lines illustrate the behaviour of various silicone resins, the full designations of a number of which are as follows:

DC 2577 = DOW CORNING 1-2577 CONFORMAL COATING

GE SR80 = GE SILICONE MICA BONDING AND MOISTURE RESISTANT VARNISH SR80

MS 460 = MILLER STEPHENSON MS-460 SILICONE RESIN COATING

As a result of these findings a commercial available silicone modified polyester/alkyd (ESL 241 from Electro-Science Labs) was tested in a cartridge, after removal of various undesirable contaminants. The testing revealed that the dielectric strength of the material was relatively low (approximately 60 $V_{rms}/\mu m$ @25 $\mu m$ thickness) such that the resulting layer had to be fairly thick (30 $\mu m$) to withstand the applied voltage. However, cartridges assembled with this increased thickness of dielectric and correspondingly increased electrode separation did not print as the alternating voltage applied over the increased electrode separation resulted in insufficient electric field strength (E) at the finger electrode edges to cause breakdown of the air ($E = V/d$, where d = electrode spacing).

The most obvious way to regain the required strength would be to increase the alternating voltage, but it would be preferable that the cartridge be suitable for use in existing machines at existing operating voltages. In addition, the currently used voltage of 2800 V peak-to-peak is considered to be higher than desired, and a lower operating voltage may improve the reliability of the cartridges. Accordingly, another approach was followed which is explained below.

The region of the cartridge between the electrodes can be considered as 2 capacitors in series. The first is formed by the dielectric material, while the second is formed by the air gap between the surface of the dielectric and the finger electrode, across the finger electrode adhesive. It was desired to maintain the voltage across this air gap while increasing the thickness of the dielectric, given a constant voltage across the 2 capacitors. The air gap was already at the minimum available (3 microns) with the adhesive used currently in the manufacturing process.

Remembering that the alternating voltage drop across a capacitor is inversely proportional to its capacitance, it was decided to increase the capacitance of the dielectric to compensate for its increased thickness. Given that capacitance is proportional to the dielectric constant of the material divided by its thickness, it was found that increasing the dielectric constant of the paste restored the cartridge to an operating region where corona could be generated, even with the 30 micron thick dielectric.

When the dielectric constant was raised from initially tested 7 to approximately 14, by the addition of a filler (titantium dioxide), print cartridges built using this new composition printed with print quality equal to cartridges constructed in the conventional manner with mica dielectric.

In practice, any dielectric material compatible with the resin matrix may be used as a filler. The most commonly used dielectric fillers include silicates such as aluminum and lead, silica, alumina, porcelains, silicon dioxide, and any of the titanates, for example barium titanate.

By varying the proportions of polymer and filler from 80/20 to 30/70 it was found that the dielectric constant could be varied between 4 and 17, and the upper values attained resulted in corona inception or threshold voltages as low as 1100 Volts peak-to-peak, compared with existing voltages of 1300–1600 Volts peak-to-peak.

To illustrate the effect of dielectric thickness and dielectric composition variations on ability to withstand electrical stress, threshold voltage and cartridge life, reference should be made to FIG. 8 which illustrates the results obtained from testing cartridges having different dielectric layers (of ESL 241).

To facilitate the increase in dielectric constant resulting from addition of the filler, a wetting agent, surface tension reducer, or adhesion promotor is added to the material. The wetting agent may also help to hold the electrical dissipation of the material down by reducing the mobility of filler particles. This becomes more important as the filler particle size is decreased because smaller particles are inherently more difficult to wet. Typically, filler materials are in the size range of five microns or less with smaller sizes generally being better.

The dielectric material is provided in the form of a resin or paste and is applied to the cartridge by screen printing While applying a single coating of required thickness is clearly more convenient, an increased number of thinner screen printings (to the limit of single layer cohesion) produces a more reliable coating. In practice, two coatings have been used. Other methods of application which may be used include extrusion, dip-coating, spraying, roll coating and draw-coating.

To alter the mechanical characteristics of the resin such as its viscosity, and to alter its drying rate to suit the particular application process, a solvent such as Butyl Cellusolve may be included in the material. When screen printing is used to apply the dielectric, as in the preferred embodiment, it is desirable that the paste have a relatively slow drying rate. Also, flow agents, usually silicone based, may be added to aid in levelling of the applied resin.

The material flows when unpolymerized so that it tends to occupy the gaps between the driver electrodes, as shown in FIG. 6. The use of the paste also dispenses with the need for adhesives to fix the dielectric to the substrate. It should be noted that the material adheres well to copper, stainless steel and solder mask, in addition to epoxy.

After application, the solvent used may be driven off either by room temperature evaporation, or if less time is available, by heating by any method or by vacuum treating.

The cartridge is then baked at 150°C.–220°C. to cure the polymer. The resulting polymerized dielectric layer is flexible and allows the cartridge to be bent and flexed to a reasonable degree without sustaining damage. Handling of the resin in the unpolymerized form is also much simplified when compared with the careful packaging required for the previously used mica sheets.

Also, the polymerized material is translucent, permitting visual alignment of components of the cartridge during manufacture, and thermal conduction of the resulting dielectric layer is around three times that of mica, and thus aids temperature control of the temperature sensitive finger electrodes.

As described above, the various properties of the material may be controlled by varying the relative proportions of the various constituents. The polymer base of the silicone may also be varied and in addition to the silicones described above, it has also been found that sulfur vulcanized natural rubber forms a suitable dielectric.

The ability to use the material to produce dielectric layers of any desired shape opens many possibilities in charge transfer imaging including the production of narrow or long cartridges, which could not be produced using mica.

It will be clear to those skilled in the art that the above description is exemplary, and that modifications and variations may be made within the scope of the invention. It should also be stressed that the particular cartridge configuration disclosed is purely exemplary, and that the invention may be embodied in any suitable cartridge.

We claim:

1. A charge transfer imaging cartridge comprising:
a dielectric substrate;
first electrodes extending in a first direction along one side of the substrate, said electrodes being continuous and without perforation;
second electrodes extending in a second direction, the second electrodes defining apertures having edges where the first and second electrodes cross; and
a continuous and imperforate dielectric layer separating the first and second electrodes, the layer being of a polymeric material containing particulate filler of a dielectric 2. A charge transfer imaging cartridge comprising:
a dielectric substrate;
first electrodes extending in a first direction along one side of the substrate, said electrodes being continuous and without perforation;

second electrodes extending in a second direction, the second electrodes defining apertures having edges where the first and second electrodes cross; and a continuous and imperforate silicone modified polymer dielectric layer separating the first and second electrodes.

3. A charge transfer imaging cartridge comprising:

a dielectric substrate;

first electrodes extending in a first direction along one side of the substrate, said electrodes being continuous and without perforation;

second electrodes extending in a second direction, the second electrodes defining apertures having edges where the first and second electrodes cross; and a continuous and imperforate silicone modified polyester/alkyd dielectric layer separating the first and second electrodes.

4. A method of making a charge transfer imaging cartridge, comprising;

providing a dielectric substrate having first electrodes extending in a first direction along one side thereof, the electrodes being continuous and without perforation;

applying a layer of polymerizerable material in liquid form and containing particulate filler of a dielectric material to the substrate to cover the first electrodes;

curing said layer;

providing second electrodes defining openings having edges; and affixing said second electrodes to the cured layer such that the second electrodes extending in a second direction and the edges are positioned where the first and second electrodes cross.

5. A method of making a charge transfer imaging cartridge, comprising:

providing a dielectric substrate having first electrodes extending in a first direction along one side thereof, the electrodes being continuous and without perforation;

applying a layer of unpolymerized silicone modified polymer dielectric to the substrate to cover the first electrodes;

curing said polymer dielectric layer;

providing second electrodes defining openings having edges; and affixing said second electrodes to the cured dielectric layer such that the second electrodes extend in a second direction and the edges are positioned where the first and second electrodes cross.

6. A method of making a charge transfer imaging cartridge, comprising:

providing a dielectric substrate having first electrodes extending in a first direction along one side thereof, the electrodes being continuous and without perforation;

applying a layer of unpolymerized silicone modified polyester/alkyd dielectric to the substrate to cover the first electrodes;

curing said polymer dielectric layer;

providing second electrodes defining openings having edges; and affixing said second electrodes to the cured dielectric edges are positioned where the first and second electrodes cross.

* * * * *